United States Patent
Holthaus et al.

(10) Patent No.: US 7,334,959 B2
(45) Date of Patent: Feb. 26, 2008

(54) FIXING DEVICE

(75) Inventors: Reinhard Holthaus, Harsewinkel (DE);
Thomas Schmid, St. Ingbert (DE)

(73) Assignee: Hydac Accessories GmbH,
Saarbrücken-Dudweiler (DE)

( * ) Notice: Subject to any disclaimer, the term of this patent is extended or adjusted under 35 U.S.C. 154(b) by 541 days.

(21) Appl. No.: 10/475,589

(22) PCT Filed: Sep. 26, 2002

(86) PCT No.: PCT/EP02/10780

§ 371 (c)(1),
(2), (4) Date: Oct. 23, 2003

(87) PCT Pub. No.: WO03/029714

PCT Pub. Date: Apr. 10, 2003

(65) Prior Publication Data

US 2004/0151534 A1    Aug. 5, 2004

(30) Foreign Application Priority Data

Sep. 27, 2001  (DE)  ................ 101 47 611

(51) Int. Cl.
*F16B 13/04* (2006.01)
(52) U.S. Cl. .............. 403/293; 403/353; 403/399
(58) Field of Classification Search ............ 403/167, 403/293, 324, 289, 321, 363, 395, 399, 408.1
See application file for complete search history.

(56) References Cited

U.S. PATENT DOCUMENTS

| | | | | |
|---|---|---|---|---|
| 2,680,892 A | * | 6/1954 | King ........................ 24/279 |
| 3,459,096 A | * | 8/1969 | Parkin ...................... 411/523 |
| 4,365,393 A | * | 12/1982 | Hauffe et al. ............... 24/279 |
| 5,010,626 A | * | 4/1991 | Dominguez ................. 24/279 |
| 5,944,365 A | * | 8/1999 | Kizler et al. ............... 285/420 |
| 6,038,744 A | * | 3/2000 | Zielinski .................. 24/20 R |
| 6,343,407 B1 | * | 2/2002 | Muto et al. ................ 24/20 R |

FOREIGN PATENT DOCUMENTS

| | | |
|---|---|---|
| DE | 1256013 | 12/1967 |
| EP | 0508050 | 10/1992 |
| EP | 0508331 | 10/1992 |
| GB | 583719 | 12/1946 |

* cited by examiner

*Primary Examiner*—Daniel P. Stodola
*Assistant Examiner*—Joshua T Kennedy
(74) *Attorney, Agent, or Firm*—Roylance, Abrams, Berdo & Goodman, L.L.P.

(57) ABSTRACT

A fixing device has a lug strip (10). At least one end (12) of the lug strip (10) is bent to form a fixing loop (14). A fixing space is provided by two enclosing pieces (16) and receives a retainer (22, 24). The retainer (22, 24) has two opposing fixing pieces (26) for a unit with the both enclosing pieces (16) and is provided with a functional piece (28, 30). Both fixing pieces (26) are diametrically opposed to each other on the respective retainers (22, 24), and have fixing surfaces. The functional piece (28, 30) runs at least partly perpendicular to the common longitudinal axis of the fixing piece (26). Each fixing surface is provided with a convex curvature. A fixing device with few components, which can be easily finished to give a lug at the site of assembly without any additions is achieved. The convex curvature of the functional piece (28, 30) runs perpendicular to the common longitudinal axis of the fixing pieces (26) essentially along a semi-circle. The separate end surfaces of the fixing pieces (26) are provided with insertion ramps on their sides facing away from the functional piece (28, 30) which extend into the corresponding semi-circle.

12 Claims, 3 Drawing Sheets

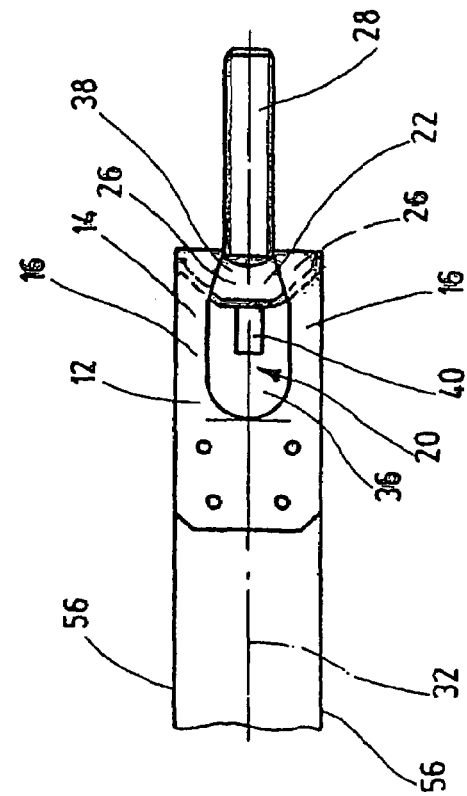
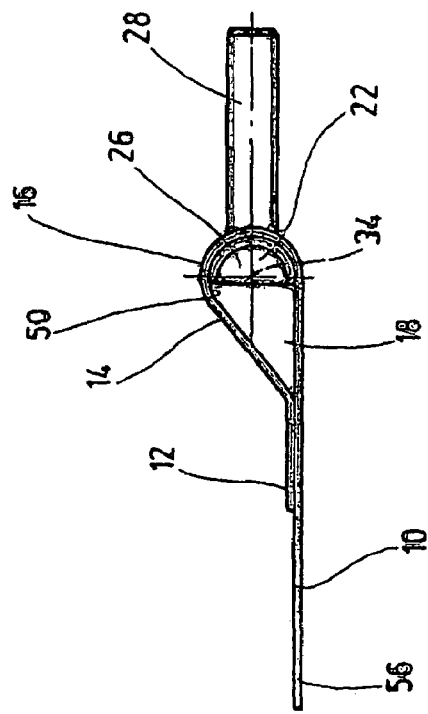
Fig.1
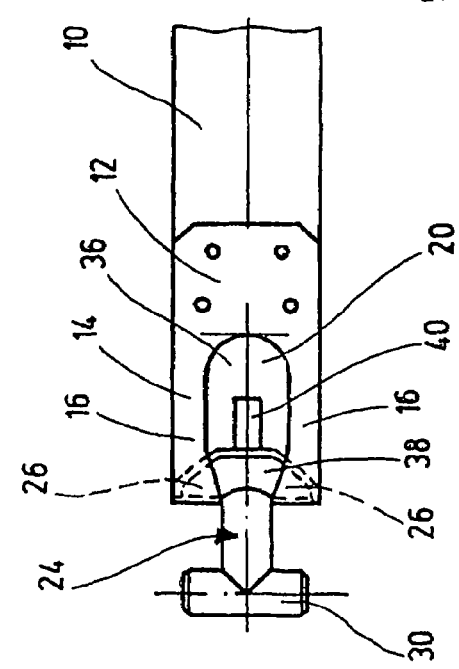
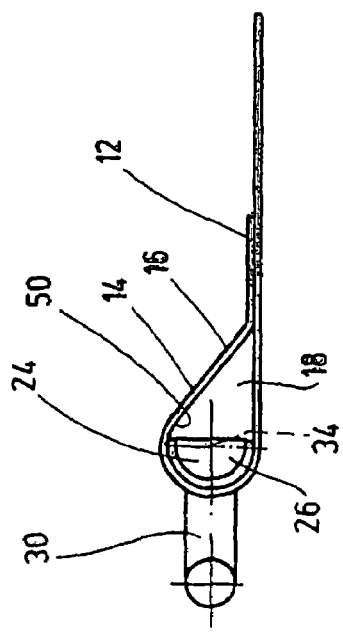
Fig.2

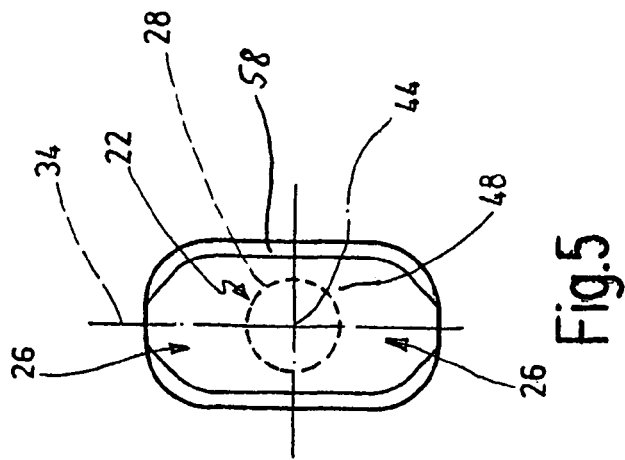
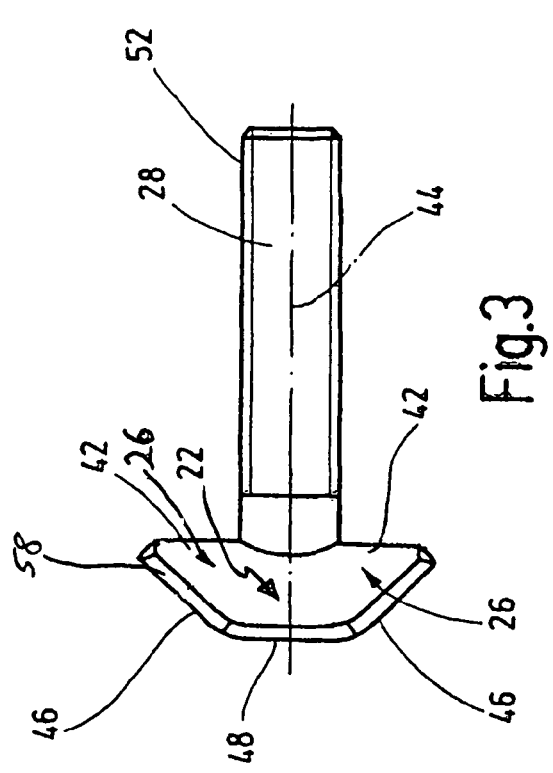
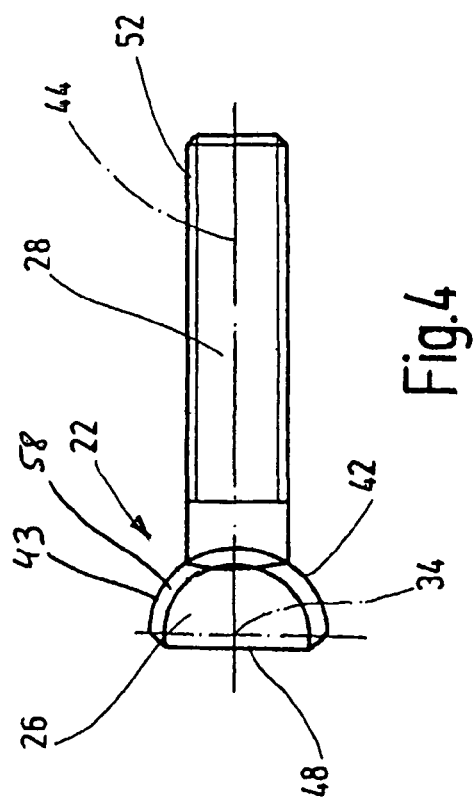

FIXING DEVICE

FIELD OF THE INVENTION

The present invention relates to a fixing device with a lug strip. At least one end of the lug strip is bent to form a mounting loop with two enclosing elements to enclose a mounting space into which retaining means may be inserted. The mounting loop has at least one mounting opening positioned between the two enclosing elements. The retaining means has two diametrically opposite retaining elements for contact with the two enclosing elements, and possesses an operating element projecting from the mounting opening in the mounting space when the retaining means is installed. At least one of the two retaining elements of the retaining means can be introduced into the installation space in one direction of installation by the mounting opening. The retaining elements can then move into contact from below with the enclosing elements after pivoting of the at least partly introduced retaining means in a fastening direction extending transversely to the direction of introduction. The dimensions of the mounting space are such that the two retaining elements of the retaining means are inserted into the mounting space with a predetermined amount of clearance. Each retaining means has two diametrically opposite retaining elements with retaining surfaces. The operating element extends at least in part perpendicularly to the common longitudinal axis of the retaining elements. The respective retaining surface is provided with a convex curvature.

A fastening device disclosed in EP-A-0 508 050 has a flexible one-piece lug strip. The two strip free ends are sealable by a sealing element for fixing a tubular component in position. For the purpose of forming the sealing element, the two free ends of the lug strip are bent, and each form a mounting loop each with two enclosing elements delimiting a mounting space communicating with the exterior by a mounting opening. Cylindrical retaining means are introduced into the two mounting spaces. The enclosing elements of one mounting loop rigidly enclose bolt-like retaining means, while the other mounting loop with its two enclosing elements loosely encompasses a pivot element as retaining means. An internal hexagonal screw has a functional length which may be adjusted and fixed in this position by a lock nut, and extends through the pivot element. The internal hexagonal screw also ensures that the pivot element cannot unintentionally fall sideways out of the mounting space of the associated mounting loop. The bolt-like retaining means, secured by the opposite mounting loop, has a recess which extends upward to communicate with the exterior and which is provided with a lug-like catch element. After the internal hexagonal screw has been introduced from above, this screw may be fastened by its head component in the catch for a tightening process. The sealing element as thus configured may be detachably locked quickly for securing tubular bodies inside the lug strip. The screw introduced into the catch is suitably fastened by tightening.

The disclosed clamp is generally preinstalled at the factory and fastened locally to the element to be secured. Predetermined lugs may accordingly be employed for one fastening purpose only as a function of the diameter of the tubular element to be secured. As regards the retaining means premounted in the mounting loop so as to be stationary, the disclosed fastening device can hardly be supplemented locally and disassembly of the lug likewise is possible only as part of an entire process and involves all operating elements. Because of the large number of operating elements and their assembly at the place of production, the disclosed solution is also relatively cost-intensive, so that it is too expensive from the technical viewpoint to apply for simple fastening purposes.

DE-B-1 256 013 discloses a strip clamp for connecting two ends of a pipeline or a hose with a socket piece. This strip clamp includes a tightening strap and a tightening device mounted near the end of the tightening strap. The ends of the tightening strap projecting above the fastening points of the tightening device for strip clamps are provided with tightening devices removable by conventional means after loosening, on one side with a slot and on the other with a hook extending perpendicularly outward and engaged in the slot during tightening so as to effect locking.

In the disclosed solution, the two tightening straps facing each other are appropriately bent in their enclosing elements, and thus, form mounting openings and mounting spaces. Both are for a fastening bolt with external threading for tightening and in the form of fastening element with a tightening nut provided with internal threading.

Both the fastening bolt and the fastening element are configured as differently shaped retaining means. Each is guided in the lug strip so as to be pivotable by two diametrically opposite retaining elements mounted in the associated mounting spaces. The respective retaining element is configured as a bolt or pin with retaining surfaces circular in cross-section, the convex curvature of which follows the course of the curvature of the bent lug strip in the area of the associated mounting space. The fastening element with the lock nut, on the other hand, is mounted in the lug strip on-site at the manufacturing firm. The fastening bolt with the external threading for tightening as an operating element may be introduced locally, that is, at the site of installation of the clamp, into the associated mounting space by the mounting opening designed for this purpose. Although the slot-like mounting opening in the lug strip is relatively wide, interlocking of the associated retaining means often occurs during the process of introduction. This interlocking correspondingly complicates the process of introduction and mounting. Should the disclosed clamp design be modified for other application purposes within the range of its operating elements, such modification can be accomplished only with difficulty because of the selected connections between lug strip and operating element.

SUMMARY OF THE INVENTION

Objects of the present invention are to provide a fastening device with a small number of components, one which may be added directly to a clamp as a supplement, and which can perform a wide range of fastening tasks and is easy to assemble and safe to operate.

These objects are basically attained by a fastening device where the convex curvature facing the operating element extends more or less along a semicircular arc transversely to the common longitudinal axis of the retaining elements. Each of the end surfaces of the retaining elements spaced some distance from each other is provided with an insertion bevel which undergoes a transition to the associated semicircular arc. In this manner, it is possible first to prepare the lug strip and make it available for assembly, and then, locally, by introduction of the respective retaining means into the associated mounting loop, to prepare the fastening means required for fastening the clamp directly on other structural components. By appropriate bending of the lug strip, the latter may be adapted simply on-site to the geometric external dimensions of the element to be fastened, which element is not necessarily tubular.

Introduction of the retaining means into the respective mounting loop facilitated by the semicircular shapes of the retaining elements and their insertion bevels. That the fastening process not only is immediately clear to an assembler, but also the respective assembly and if necessary disassembly process is so easy that the necessary steps may be taken in rapid sequence for a plurality of lug connections without the possibility of occurrence of disruptive interlocking or the like. In the aggregate, this design results in distinctly improved handling of the fastening device. Any faulty assembly is also eliminated in this way. In addition, the lug strip may be loosened immediately after removal of the retaining means, while the retaining means may also remain at the fastening site. However, it is also possible, of course, to introduce the fastening device as a whole, as assembled, immediately at the factory. The fastening device of the present invention has proved to be suitable in particular for use in the motor vehicle industry, for example, when it is necessary securely to fasten air filters subject to vibration or the like within a vehicle.

In one preferred embodiment of the fastening device of the present invention, the mounting opening of the respective mounting loop extends along the longitudinal axis of the lug strip. The mounting opening has at least two component areas with different opening cross-sections. The component area with the larger opening cross-section is used for introduction of the restraining means. The other component area with the smaller opening cross-section is for passage of the operating element when the retaining means has been fully introduced into the mounting loop. As a result, simplicity of introduction of the respective retaining means into the associated mounting loop is ensured, while with the retaining means introduced, if the operating element passes through the component area with the smaller cross-section, cannot unintentionally fall from the mounting loop, something which definitely facilitates assembly and handling of the fastening device of the present invention.

In another preferred embodiment of the fastening device of the present invention, in addition to the two component areas, a third component area is present and is in the form of a slot with a further reduced opening cross-section that adjoins the second component area and forms a stop for the operating element. Forces acting on the mounting loop, such as ones in the form of vibration forces, can be reliably diverted to the lug strip. Although the clamp structure is naturally weakened by the slot, a higher level of stability is thereby reached. Since the slot additionally forms a stop for the operating element, subsequent automatic assumption by the lug strip, after its installation, of the proper associated operating position relative to the operating element of the respective retaining means is ensured.

Preferably, additional provision is made such that the respective retaining means has two diametrically opposite retaining means with retaining surfaces. The operating element extends perpendicularly to the common longitudinal axis of the retaining elements.

Preferably, provision is also made such that the enclosing elements of the respective mounting loop are provided with a convex curvature to form contact surfaces which correspond to the convex curvature of the retaining surfaces when the retaining means have been fixed in position. Adaptation of the convex curvature of contact surfaces to retaining surfaces ensures reliable contact, along with the desired diversion of forces into the lug strip, when the retaining means has been fixed in position.

In another preferred embodiment of the fastening device of the present invention, the respective operating element is provided on its free end with a screw insertion threading or has a lock bolt whose free ends end in the area of the two longitudinal edges of the lug strip after the retaining means have been introduced. As a result, the operating element with the lock bolt may be fastened, by simple manipulation by a type of clip and the respective retaining means. A lock nut is provided for the screw insertion. The lug strip may be suitably tightened for a fastening process.

Preferably, the retaining means is designed to be of one piece in the form of a hammer head. The lug strip is susceptible to manual bending. The retaining means is preferably formed of steel for screws, and accordingly, is tough enough to absorb strong forces. Since the lug strip is highly flexible although it is made of a steel strip, it may be immediately adapted to local fastening process conditions.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a top plan view of a fastening device according to a first embodiment of the present invention, with lug strip and retaining means introduced;

FIG. 2 is a side elevational view of the fastening device of FIG. 1;

FIGS. 3, 4, and 5 are front and side elevational views and a bottom plan view, respectively, of one of the retaining means of FIG. 1.

DETAILED DESCRIPTION OF THE INVENTION

Figure 8:
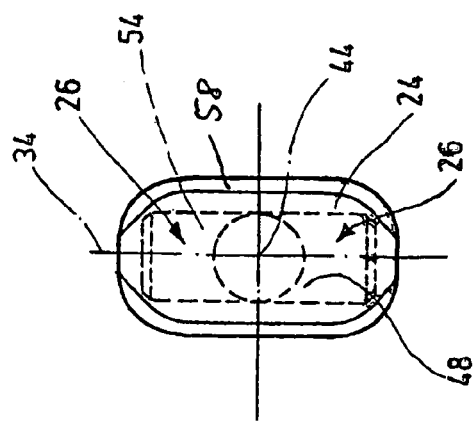
FIGS. 6, 7, and 8 are front and side elevational views and a bottom plan view of the other of the retaining means of FIG. 1.

As is to be seen in FIGS. 1 and 2, the fastening device has a one-piece flexible lug strip 10. The length and width of the lug strip 10 may be predetermined. The two free ends 12 of the lug strip are bent, with each end forming a mounting loop 14. Each mounting loop 14 is bounded laterally by two enclosing elements 16 which enclose a mounting space 18. Between the enclosing elements a mounting opening 20 is delimited connecting the mounting space 18 to the exterior.

Retaining means 22, 24 may be introduced into the two mounting spaces 18. Each retaining means 22, 24 has two diametrically opposite retaining elements 26 for contacting the two enclosing elements 16, as well as an operating element 28, 30 projecting into the respective associated mounting space 18 from the mounting opening 20 after the retaining means 22, 24 have been introduced.

Each retaining means 22, 24 may be introduced with one of its two retaining elements 26 into the associated mounting space 18 by the mounting opening 20 in one direction of insertion. Such direction of insertion extends parallel with the longitudinal axis 32 of the lug strip 10. When the respective retaining means 22, 24 is inserted, the longitudinal axis of its respective two retaining elements 26 is oriented more or less in parallel with the longitudinal axis 32 of the lug strip 10. If one retaining element 26 of the respective retaining means 22, 24 is introduced into the mounting space 18 through the mounting opening 20, it is pivoted manually in one direction of fastening to extend more or less transversely to the direction of insertion and accordingly perpendicularly to the longitudinal axis 32 of the lug strip 10, by pivoting of the retaining means 22,24.

In the respective installation situation, the two retaining elements 26 of the respective retaining means 22, 24 then establish contact from below by their lower end with the respective enclosing element 16 of a mounting loop 14. The fastening situation of the two retaining means 22, 24 corresponds to that illustrated in FIGS. 1 and 2. At least in this installation situation, the retaining means 22, 24 may be pivoted about their respective longitudinal axis 34 as it is guided while moving in the mounting space 18, as viewed in the line of sight toward FIGS. 1 and 2, clockwise for the left retaining means 24 and counterclockwise for the opposite retaining means 22. Accordingly both retaining means 22, 24 are mounted in the assigned mounting loop 14 in the direction of their insertion so that they may be pivoted back and consequently extracted from mounting loop 14 as the lug strip 10 is released.

The mounting opening 20 of the respective mounting loop 14 extends along the longitudinal axis 32 of the lug strip 10. The mounting opening 20 has three component areas 36, 38, and 40 with different opening cross-sections, and in particular, ones decreasing in size in this sequence. As has already been pointed out, the first component area 36 has the largest opening cross-section for insertion of the respective retaining means 22, 24. The following second component area 38 has a smaller opening cross-section allowing passage of the operating element 28, 30 after the retaining means 22, 24 has been fully introduced into the mounting loop 14.

The third component area 40 adjoining the second component area 40 is in the form of a slot opening. A stop is thereby formed for the respective operating element 28,30 at the point of transition of the openings with different cross-sections between the second and third component areas 38 and 40. The stop ensures a preassembly location, something which makes mounting of the fastening device on other components, such as ones in the interior of a vehicle, much easier.

Figure 6:
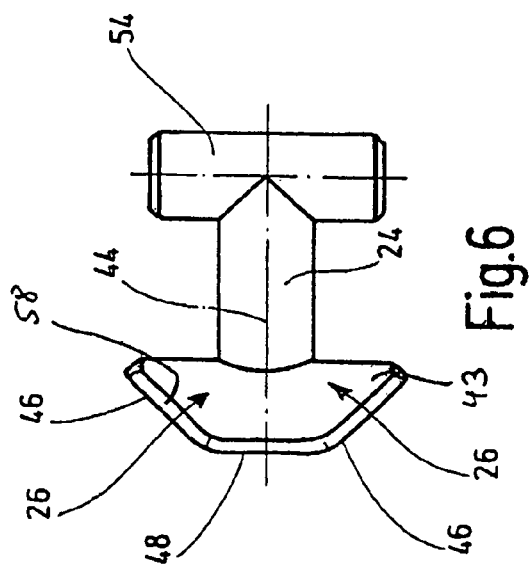
Figure 7:
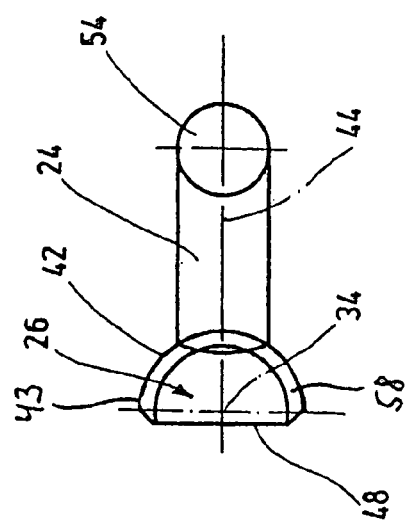

As is to be seen in FIGS. 3 to 8, the respective hammer head fastening means 22, 24 has two diametrically opposite fastening elements 26 with retaining surfaces 42. The longitudinal axis 44 of the operating element 28, 30 extends perpendicularly to the common longitudinal axis 34 of the retaining elements 26. As is also seen in the drawings, the respective retaining surface 42 is provided with a convex curvature. The end surfaces of the retaining elements 26 are separated by some distance from each other, and are provided on the side facing away from the operating element 28,30 with an insertion bevel 46. The insertion bevel 46 in particular forms an angle of about 45° with the lower side 48 extending perpendicularly to the longitudinal axis 44 of the operating elements 28, 30. In addition, as seen in FIGS. 4 and 7, the convexly curved retaining surfaces 42 as seen more or less from the side, that is, transversely to their common longitudinal axis 34, form a semicircular arc 43 facing in the direction of the respective operating element 28, 30. Also, the retaining surfaces 42 of the retaining elements 26 can be provided at least to some extent with chamfers 58. This arrangement also facilitates the processes of introduction and removal for the respective retaining element 26.

The enclosing elements 16 of the respective mounting loop 14 are also provided with a concave curvature to form contact surfaces 50 (see FIG. 2). This concave curvature corresponds to that of the retaining surfaces 42 referred to when the retaining means 22, 24 have been fixed in position. The respective retaining means 22, 24 may accordingly follow the curvature of the contact surfaces 50 by their retaining surfaces 42, so that coincident contact with the enclosing elements 16 is achieved. In the fastened area of the respective retaining means in particular, covering bottom contact with the enclosing elements is achieved by that contact. As a result, high forces may be dissipated into the lug strip 10 when the lug strip 10 is in the fastened state.

The operating element 28 shown in FIGS. 3 to 5 is provided on its free end with a screw insertion threading 52 so that the retaining means 22 may be secured to mounting parts not shown here by a lock nut assembly. When the retaining means 24 is configured as shown in FIGS. 6 to 8, the operating element 30 is provided on its free end with a fastening bolt 54. The free ends of bolt 54, as shown in FIG. 1, end in the area of the two longitudinal edges 56 of the lug strip 10. The fastening bolt 54 may be fastened to mounting parts by two clasp-like fingers of another fastening element (not shown). It is possible to pivot the lug strip 10 to a limited extent, at least as far as the stop referred to, opposite the retaining surfaces 42 of the retaining means 22. If the lug strip 10 then overlaps an element (not shown), such as one in the form of a tubular disk filter or the like, the lug strip 10 may be placed under tension by the retaining means 22 with its screw insertion threading 52 correspondingly on a fastening element by the lock nut connection to ensure firm seating.

The fastening device illustrated comprises a small number of components, specifically the lug strip 10 and the two retaining means 22, 24, so that the assembly may be supplemented at the production factory, but by preference locally at the installation site. The assembly is easy to disassemble, so that when the element to be fastened, such as one in the form of a disk filter or the like, is replaced, the replacement process may be completed rapidly. The respective replacement and installation periods may accordingly also be kept brief.

While one embodiment has been chosen to illustrate the invention, it will be understood by those skilled in the art that various changes and modifications can be made therein without departing from the scope of the invention as defined in the appended claims.

What is claimed is:

1. A fixing device, comprising:
    a lug strip having a first end bent to form a first mounting loop, said mounting loop having two first enclosing elements enclosing a first mounting space and having only a single mounting opening between said enclosing elements and extending along a longitudinal axis of said lug strip; and
    a first retaining means releasably received within said mounting space having two opposite solid retaining elements extending along a common longitudinal axis for engaging said enclosing elements and having an operating element projecting from said mounting opening and extending along an operating element longitudinal axis perpendicular to said common longitudinal axis, said retaining means being introducible into said mounting space by at least one of said retaining elements passing through said mounting opening and engaging inner surfaces of said enclosing elements after pivoting of said retaining means in a first fastening direction transverse to an introduction direction after being at least partly introduced into said mounting space, said retaining elements fitting into said mounting space with a predetermined clearance, said retaining elements having convexly curved retaining surfaces diametrically opposite each other and facing said operating element, said retaining surfaces being semi-circular cylinders with an axis parallel to said common longitudinal axis, said retaining elements having end surfaces spaced from one another on a side thereof facing away from said operating element, said end surfaces having insertion bevels transitioning into said retaining surfaces.

2. A fixing device according to claim 1 wherein said mounting opening comprises first and second component areas with larger and smaller opening cross sections, respectively, said first component area opening laterally relative to said longitudinal axis of said lug strip allowing introduction of said retaining means laterally into said mounting space, said second component area receiving said operating element therein when said retaining means is fully introduced within said mounting space and said operating element extends along said longitudinal axis of said lug strip.

3. A fixing device according to claim 2 wherein said mounting opening comprises a third component area configured as a slot with a smaller opening cross section than said second component area and smaller than a transverse diameter of said operating element to provide a stop therefore, said third component area adjoining said second component area towards a remainder of said lug strip.

4. A fixing device according to claim 1 wherein said inner surfaces of said enclosing elements have concave curvatures corresponding to said convexly curved retaining surfaces.

5. A fixing device according to claim 1 wherein said operating element has a screw insertion thread on a free end thereof.

6. A fixing device according to claim 1 wherein said operating element has a fastening bolt on a free end thereof, said fastening bolt having free ends adjacent longitudinal edges of said lug strip.

7. A fixing device according to claim 1 wherein said retaining means is formed as a single unitary piece with a hammer-shaped head; and said lug strip is manually bendable.

8. A fixing device according to claim 1 wherein said insertion bevels are joined by a level lower side facing away from said operating element.

9. A fixing device according to claim 1 wherein said retaining surfaces have chamfers at least on portions of peripheries thereof.

10. A fixing device according to claim 1 wherein said lug strip comprises a second end, opposite said first end, bent to form a second mounting loop having two second enclosing elements enclosing a second mounting space and having only a single mounting opening between said second enclosing elements and extending along said longitudinal axis of said lug strip, each of said mounting openings facing in opposite directions when said lug strip between said mounting loops is straight; and
a second retaining means, formed similar to said first retaining means, is releasably received in said second mounting space, and includes a second operating element.

11. A fixing device according to claim 10 wherein said operating elements extend in opposite directions along said longitudinal axis of said lug strip.

12. A fixing device according to claim 1 wherein said mounting opening extends along a longitudinal end of said mounting loop.

* * * * *